(12) United States Patent
Cazals et al.

(10) Patent No.: US 8,820,676 B2
(45) Date of Patent: Sep. 2, 2014

(54) AIRPLANE WITH PITCH AND YAW COMMAND BY PROPULSION SYSTEM

(75) Inventors: Olivier Cazals, Daux (FR); Thierry Druot, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 821 days.

(21) Appl. No.: 12/413,833

(22) Filed: Mar. 30, 2009

(65) Prior Publication Data

US 2010/0019081 A1    Jan. 28, 2010

(30) Foreign Application Priority Data

Apr. 2, 2008  (FR) ...................................... 08 52172

(51) Int. Cl.
*B64D 27/00*   (2006.01)
*B64C 29/00*   (2006.01)
*B64C 23/00*   (2006.01)

(52) U.S. Cl.
CPC ........... *B64C 29/0033* (2013.01); *B64C 23/005* (2013.01); *B64C 2700/6274* (2013.01)
USPC .......................................................... 244/56

(58) Field of Classification Search
CPC .............. B64C 29/0033; B64C 23/005; B64C 2700/6274
USPC ........................ 244/56, 12.4, 12.5, 23 B, 23 D
See application file for complete search history.

(56) References Cited

U.S. PATENT DOCUMENTS

| | | | | |
|---|---|---|---|---|
| 2,926,869 A | * | 3/1960 | Sullivan ........................ | 244/12.4 |
| 3,181,810 A | * | 5/1965 | Olson ........................... | 244/7 R |
| 3,284,027 A | * | 11/1966 | Mesniere ...................... | 244/12.4 |
| 3,469,803 A | * | 9/1969 | Schmielau .................... | 244/12.4 |
| 3,614,034 A | * | 10/1971 | Townsend ..................... | 244/56 |
| 4,482,108 A | * | 11/1984 | Sutton .......................... | 244/12.4 |
| 4,492,353 A | * | 1/1985 | Phillips ........................ | 244/12.4 |
| 6,719,244 B1 | * | 4/2004 | Gress ............................ | 244/7 R |
| 7,275,493 B1 | * | 10/2007 | Brass ............................ | 114/272 |
| 7,472,863 B2 | * | 1/2009 | Pak .............................. | 244/12.5 |
| 8,056,852 B1 | * | 11/2011 | Dizdarevic et al. ............ | 244/36 |
| 2005/0072876 A1 | | 4/2005 | Ducasse | |
| 2005/0133664 A1 | | 6/2005 | Cummings et al. | |
| 2007/0176047 A1 | * | 8/2007 | Moore et al. .................... | 244/54 |
| 2009/0065632 A1 | * | 3/2009 | Cazals ........................... | 244/15 |

FOREIGN PATENT DOCUMENTS

| | | |
|---|---|---|
| CA | 2 507 280 A1 | 11/2006 |
| FR | 2 899 200 A | 10/2007 |
| GB | 2 282 353 A | 4/1995 |

* cited by examiner

*Primary Examiner* — Valentina Xavier
(74) *Attorney, Agent, or Firm* — Greer, Burns & Crain, Ltd.

(57) ABSTRACT

Swiveling engines attached to the fuselage by struts, for example to the rear part of the fuselage are used to control the pitch and yaw movements of an aircraft.

The swivel axes of the engines are oriented to form a V so that swiveling one engine creates a variation of the vertical and lateral components of the engine thrust. Controlled swiveling of the two swiveling engines makes it possible to generate a component of the resultant thrust in a vertical plane that can be controlled in direction and intensity to generate pitch and yaw torques.

The swiveling engines also include pods provided with jet deflection flaps for the engine considered, and the struts are profiled and provided with a trailing edge control surface using ruddervator architecture.

11 Claims, 8 Drawing Sheets

AIRPLANE WITH PITCH AND YAW COMMAND BY PROPULSION SYSTEM

CROSS-REFERENCE TO RELATED APPLICATIONS

This application claims priority to and the benefit of French Application No. 0852172 filed on 2 Apr. 2008, the disclosure of which is incorporated by reference in its entirety.

BACKGROUND

The disclosed embodiments concern the field of transport aircraft, such as civilian transport aircraft.

More specifically, the disclosed embodiments concern an aircraft with fixed propulsion engines near the fuselage at a point far from the center of gravity of the aircraft, such as engines installed on the rear of the fuselage.

For reasons of stability and attitude and trajectory control, airplanes generally have tail units combined with aerodynamic control surfaces.

The role of these tail units and control surfaces is well known to aircraft designers, and the dimensions of the tail units, as well as the dynamics of their moving parts, adjustable horizontal plane (trim), elevators or rudders, are determined to meet the requirements for safety, operational performance and comfort.

One widespread aircraft architecture, particularly for civilian transport planes, uses tail units made up of horizontal aerodynamic surfaces, a horizontal tail unit and a vertical aerodynamic surface, a vertical tail unit or fin attached to the fuselage in the rear part in back of the wing, and said surfaces have hinged moving flaps, elevators and yaw control surfaces, respectively, on their trailing edges.

In another known form, the tail units are comprised of two aerodynamic surfaces inclined to form a V, called a V-tail, which simultaneously performs the functions of a vertical and horizontal tail unit.

In these known examples, the propulsion engines are attached to the fuselage or the wing of the aircraft by dedicated means independent of the tail units, and the aerodynamic drag associated with wet shapes and surfaces of the different elements accumulate, as does their weight, which is detrimental to the performance of the aircraft.

In addition, the aerodynamic control surfaces have an effectiveness that varies with the square of the relative speed of the aircraft in relation to the air and, because of the aircraft control conditions at low in-flight and ground speeds, it is generally necessary to use tail units whose dimensions are not justified for cruising, the majority of the time, which is another penalty of the known architectures.

It is also known when an aircraft has laterally distant engines, for example engines under the wing on each side of the axis, how to use different thrusts between the left engine and the right engine to create yawing torque.

However, this type of control, used to manually roll some aircraft, and exceptionally in flight when there is a loss of aerodynamic control, proves limited because of the response time of engines like jets and the impossibility of acting effectively on the pitch axis.

SUMMARY

To improve the control qualities of an aircraft and reduce the penalties of weight and aerodynamic drag of the known architectures, this disclosed embodiment proposes an aircraft whose pitch and yaw control uses, at least partly, the thrust of the engines by acting in the direction of the thrust, which can be modified effectively within the necessary amplitude and with the necessary speed.

To do so, the aircraft in the disclosed embodiments has a wing, a fuselage and at least two jet engines attached to the fuselage on the outside of the fuselage and at a point far from the center of gravity G of the aircraft by an engine support structure called an engine pylon, and:

each of the at least two engines is mounted so it can swivel on an axis located approximately in plane YZ of an aircraft reference system perpendicular to the longitudinal axis of the aircraft, also the X axis of the aircraft reference system;

the swivel axes of the at least two swiveling engines are oriented, on one hand, approximately symmetrically in relation to a vertical plane of symmetry XZ of the aircraft and, on the other hand, depending on the orientation, are inclined, neither horizontally in direction Y of the aircraft reference system, nor vertically in direction Z of the aircraft reference system, so as to form a V-shaped layout.

In one embodiment, each of the two swiveling engines has an engine nacelle, which itself has at least three moving flaps for deflecting the jet of an engine in the rear part of the engine nacelle. The engine nacelle flaps make it possible to change the direction of the jet by a combination of deflecting the moving deflection flaps, hence by redundant means, and, with a dynamic different from that of swiveling the engines, to change the direction of the engine thrust, as in the case of swiveling the engines.

In one preferred mode, in order to uncouple the deflections of the jet in a vertical plane XZ and in a horizontal plane XY of the aircraft reference system, each engine nacelle has at least two flaps moving in an approximately vertical direction, each on an approximately horizontal axis in the aircraft reference system, called vertical flaps, to deflect the jet of the engine in an approximately vertical plane XZ and at least two flaps moving in an approximately horizontal direction, each on an approximately vertical axis in the aircraft reference system, so-called horizontal flaps for deflecting the jet of the engine in an approximately horizontal plane XY.

To participate in the aerodynamic stability of the aircraft in flight, each engine pylon of the two engines is formed, particularly in shape and surface, to serve as an aerodynamic stabilization surface of the aircraft.

Advantageously, the engine pylons shaped like this are each provided with at least one flap on the trailing edge forming an aerodynamic control surface, so that the engine pylons form a V-shaped tail unit of the aircraft and also form a unit for means of controlling the pitch and yaw of the aircraft, independent of and complementary to the swiveling of the engines and engine nacelle flaps.

To make sure the swiveling engines are attached to the aircraft so they are resistant and reliable, advantageously each of the two swiveling engines is attached to the corresponding engine pylon with no degree of, freedom, and each engine pylon is attached so it can swivel on the fuselage.

In one preferred embodiment, to generate the necessary swiveling forces with the necessary precision and reliability, each engine pylon has a working box to one end of which is attached the engine and at the root of which a shaft cooperates with a frame of the fuselage so as to give to said engine pylon a degree of freedom in rotation around the swivel axis and in which aircraft an actuator is connected to the working box, on one hand, and to a structure on the fuselage, on the other, to be able to produce a drive torque as the box rotates on said swivel axis.

Because of the importance of the functions provided, particularly control of the aircraft in flight, and the risks in an area that could be impacted by debris from an engine burst, the frame is composed of at least two assembled elements, and the shaft is composed of at least two coaxial shafts using a so-called "fail safe" design.

To meet the requirements for stabilizing and controlling the aircraft, the moving parts are determined so that the servo time constants are on the order of one second or more for motion control dynamics on swivel axes of the engines and/or are determined for servo time constants less than a second for control dynamics of engine nacelle flaps and/or trailing edge engine pylon elevators, and means of control formulate orders to swivel engines as a priority to balance the aircraft or trim functions, and formulate orders to deflect engine nacelle flaps or trailing edge engine pylon elevators as a priority for steering or dynamic stability functions.

BRIEF DESCRIPTION OF THE DRAWINGS

The aircraft in the disclosed embodiments is described with reference to the figures, which show schematically.

DETAILED DESCRIPTION

Figure 1:
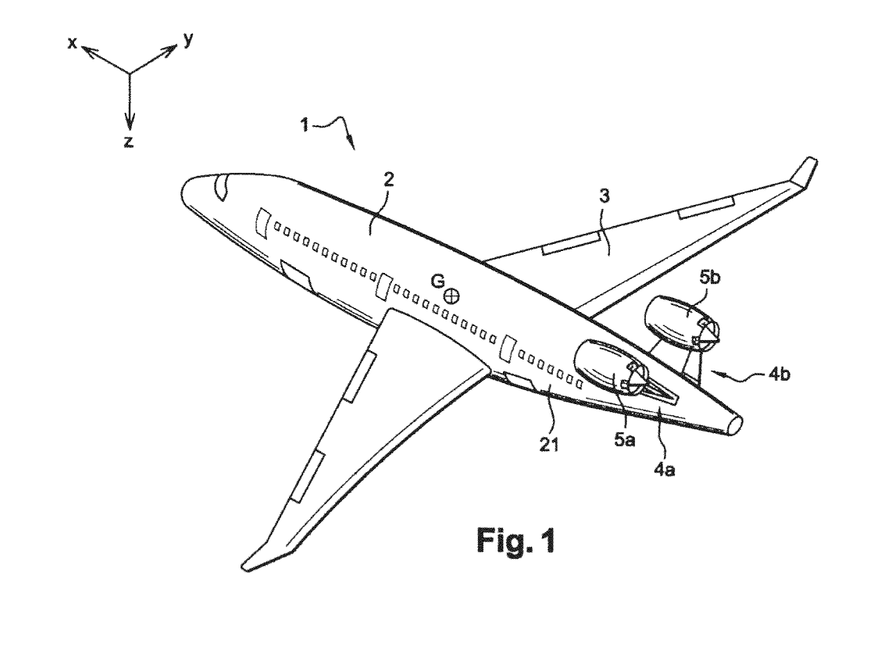
FIG. 1: a perspective view of an example of the aircraft in the disclosed embodiments in a cruising flight configuration with swiveling rear engines.
Figure 2A:
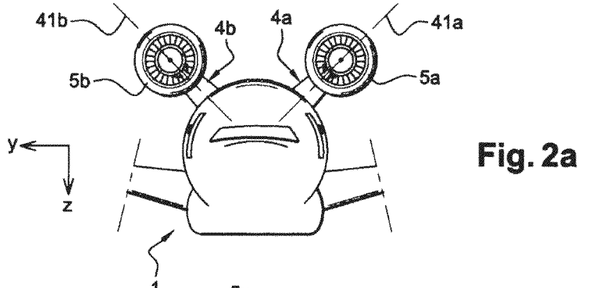
FIGS. 2a, 2b, 2c: front, profile and bottom views of the rear part of the aircraft in FIG. 1.
Figure 2B:
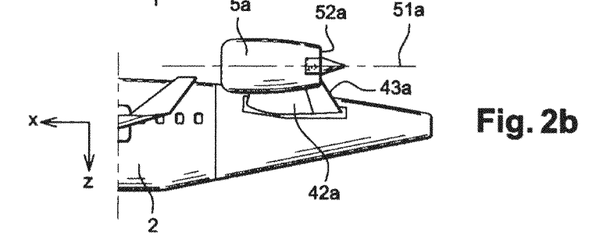
Figure 2C:
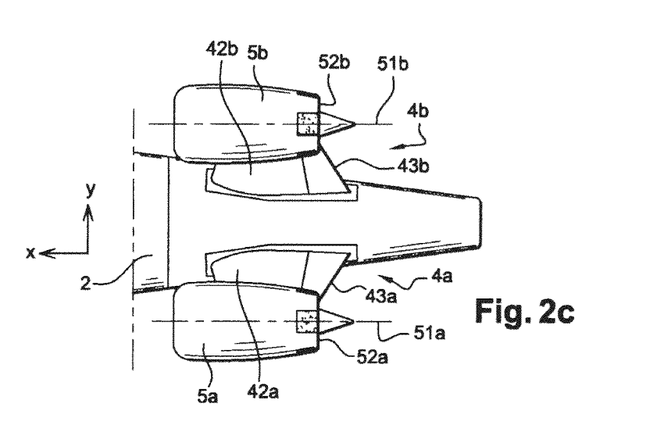

An aircraft 1, presented in FIG. 1, according to the disclosed embodiments, has a conventional fuselage 2 and wing 3 and at least two propulsion engines 5a, 5b attached to the exterior of the fuselage 2 by a connecting structure 4a, 4b, a so-called engine pylon, between the fuselage 2 and each engine 5a, 5b.

For purposes of description, reference is made to three main directions of a conventional aircraft reference system:

direction X parallel to a longitudinal axis of the fuselage 2 oriented positively toward the front of the aircraft;

direction Z perpendicular to direction X and parallel to a vertical plane of symmetry of the aircraft oriented positively downward;

direction Y perpendicular to plane XZ, determined by directions X and Z, oriented positively toward the straight line of the aircraft.

The engines 5a, 5b are jets, as illustrated in the figures in the example of embodiment of the disclosed embodiments described in detail or, more generally, engines with an engine nacelle subject to the aerodynamic flow generated by the engine, for example engines with shrouded propellers (case not illustrated).

The engines 5a, 5b are attached to the fuselage 2, preferably in an area of the fuselage as far as possible from a point G, which corresponds to the center of gravity of the aircraft, with the center of gravity G generally near the longitudinal axis of the fuselage.

Advantageously, for various reasons, such as questions of centering, noise inside the aircraft or safety, the engines are attached on the rear part 21 of the fuselage and above the fuselage, as in the example of embodiment described in detail and illustrated in a non-limiting way in the figures.

The engine pylons 4a, 4b that hold the engines 5a, 5b on the fuselage 2 form a V in plane YZ defined by directions Y and Z, that is, preferably axes 41a, 41b of said engine pylons are neither horizontal, i.e., along Y, nor vertical, i.e., along Z in the aircraft reference system.

The engine pylons 4a, 4b thus form a V-shaped tail unit structure, with each engine pylon preferably having a cross section in the form of an aerodynamic shape like the aerodynamic surfaces of a tail unit and each having, on its trailing edge, at least one hinged elevator 43a and 43b, able to be deflected in relation to the main structure 42a or 42b of the engine pylon.

Each engine 5a, 5b is mounted to swivel on a swivel axis, with said swivel axis being neither horizontal nor vertical, so that the swivel axes of the engines form a V approximately in plane YZ.

Advantageously, a swivel axis of an engine 5a, 5b is approximately parallel to axis 41a, 41b of the engine pylon, to which the engine considered is attached, so that the orientation of a longitudinal axis 51a, 51b of the engine, corresponding approximately to the main axis of thrust of the engine, is modifiable in a plane perpendicular to the axis of the engine pylon by rotating the engine on the swivel axis.

The swivel axis is, for example, combined with the axis 41a, 41b of the engine pylon, as in one example of embodiment described in detail further on.

Each engine 5a, 5b, more precisely each engine nacelle, also has aerodynamic flaps located near the trailing edge 52a, 52b of said engine nacelle, that is, near the edge of the engine nacelle considered from the side of an ejection hose toward one rear end of the engine nacelle.

Each aerodynamic flap corresponds in surface to a part of the engine nacelle whose dimensions in span, along the length of the engine nacelle in the longitudinal direction of the engine, and in wing span, along the perimeter of the engine nacelle, are determined as functions of the desired deflection performance of the jet of the engine considered and installation stresses on the flap based on the various structures and the various systems that must cohabitate in the engine nacelle area.

Each flap is hinged on the front so it can be oriented in the radial direction of the engine, in the direction of axis $51a$, $51b$ of the engine or in the opposite direction, and deflect the aerodynamic flow to the exit of the engine nacelle in order to create a radial component of the engine thrust.

In order to be able to deflect the aerodynamic flow of the jet engine in all directions, regardless of the orientation of the engine, an engine nacelle of an engine $5a$, $5b$ has at least three aerodynamic flaps approximately equally distributed over the rear exit perimeter of the engine nacelle, and, advantageously, with reference to FIGS. $4a$, $4b$ and $4c$, four flaps are arranged as illustrated in FIGS. $2b$ and $2c$, so that two deflection flaps in an approximately vertical direction, so-called vertical flaps $531a$, $532a$ and $531b$, $532b$, respectively, hinged on an approximately horizontal axis, act to deflect the flow in an approximately vertical plane XZ of the aircraft and two deflection flaps in an approximately horizontal direction, called horizontal flaps $533a$, $534a$ and $533b$, $534b$, respectively, hinged on an approximately vertical axis, act to deflect the flow in an approximately horizontal plane XY of the aircraft.

Thus, the aircraft 1 in the disclosed embodiments has three units with means of producing variable forces in direction Z of the aircraft reference system, forces that generate variable pitch torques on the aircraft, and variable forces in direction Y of the aircraft that generate variable yawing torques on the aircraft and, in general, variable forces in plane YZ determining a component of force in direction Y and a component of force in direction Z.

The three units are:
a first unit designated "swivel engines";
a second unit designated "engine nacelle flaps";
a third unit designated "engine pylon control surfaces".

It is understood that each unit, adapted for its use, makes it possible to produce variable forces basically oriented in directions Y and Z of the aircraft, and hence torques around the center of gravity G of the aircraft 1, particularly because of the distance from the center of gravity G to points of application of the forces generated, oriented in the direction of the Z axis, respectively in the direction of the Y axis, as is now detailed for each unit, it being understood that different units are used together, if need be, based on particular operational needs.

Figure 3A:
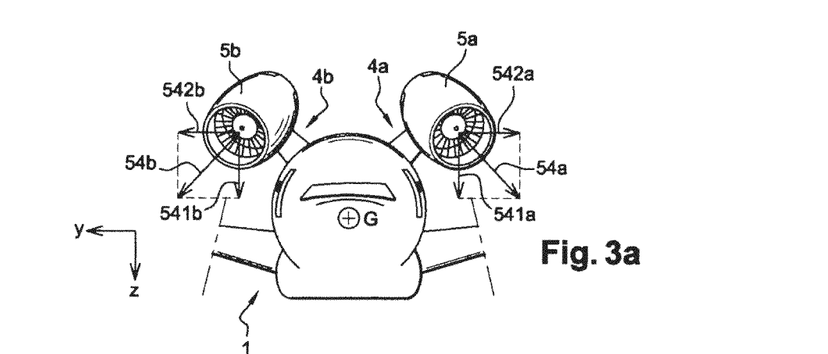
FIG. 3a: a front view of the aircraft in FIG. 1 in which the engines are swiveled to create a pitching torque to nose up.
Figure 3B:
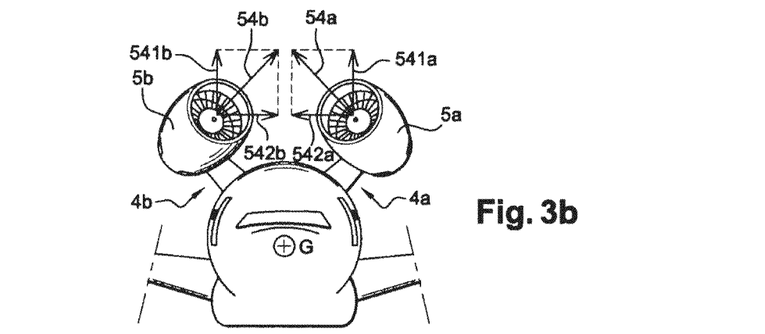
FIG. 3b: a front view of the aircraft in FIG. 1 in which the engines are swiveled to create a pitching torque to dive.
Figure 3C:
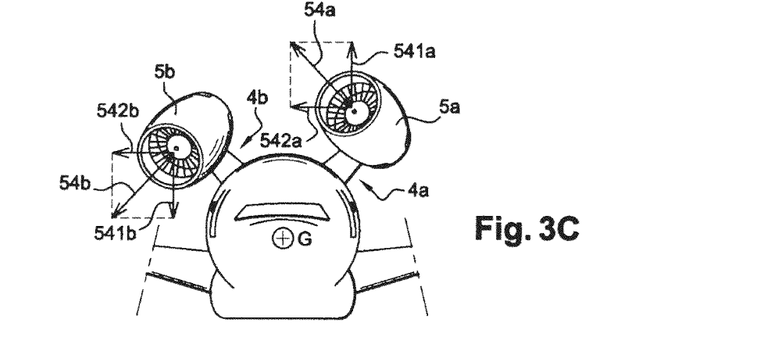
FIG. 3c: a front view of the aircraft in FIG. 1 in which the engines are swiveled to create a yawing torque.

Use of swiveling engines:
This mode of operation is illustrated in FIGS. $3a$, $3b$ and $3c$.

The propulsion engines $5a$, $5b$ generate, as their main function, a force necessary for propulsion oriented approximately along axis $51a$, $52b$ of the engine toward the front of the aircraft 1.

In the traditional flight configuration, the axes $51a$, $51b$ of the engines are approximately parallel to the longitudinal axis X of the aircraft.

For various reasons, for example to optimize certain phases of flight, the engine axes $51a$, $51b$ are sometimes, in a neutral position, slightly staggered in orientation in relation to the direction X of the aircraft 1, but always at small angles. For constant orientation of the engines in the aircraft reference system, the effect of the engine thrust on the torque along the Z or Y axes is therefore limited to cases of flight in which the thrust is modified in intensity, which does not make it possible to control the attitude of the aircraft when the thrust is imposed by other criteria, for example, maintaining the speed of the aircraft.

In the disclosed embodiments, when an engine $5a$ or $5b$ in the first unit of engines that can be oriented swivels on the swivel axis, the longitudinal axis $51a$ or $51b$, respectively, of the engine, and hence the orientation of the thrust $54a$ or $54b$, respectively, produced by the engine being considered changes direction in the aircraft reference system, which has the effect of modifying the values of the components $541a$, $541b$ of the thrust, called the vertical thrust components, along direction Z of the aircraft reference system, and components $542a$, $542b$ of the thrust, called horizontal thrust components, in direction Y of the aircraft reference system.

When the two engines $5a$, $5b$ are swiveled at an equivalent diving angle, as illustrated in FIG. $3a$, the resultant of the thrust of each engine $54a$, $54b$, includes a component oriented, on one hand, downward $541a$, $541b$, and, on the other hand, because of the angle formed by the swivel axes, in symmetrical lateral directions in relation to the vertical plane XZ of symmetry of the aircraft, toward the exterior $542a$, $542b$ in the configuration of the swivel axes in FIG. $3a$.

Since the two engines $5a$ and $5b$ have very close thrusts in normal operation, the result is a resultant component of the thrust of the two engines along Z downward due to the swiveling, the sum of the downward components $541a$ and $541b$ of each engine, and a lateral component along Y approximately zero, the algebraic sum of the lateral components $542a$ and $542b$ of each engine, approximately the same intensity, but opposite directions.

This configuration of the swiveling of the engines in FIG. $3a$ corresponds to the creation of a torque to nose up the aircraft 1, which tends to a positive rotation around the Y axis of direction.

In a similar operation, when the engines $5a$, $5b$ are swiveled at the same angle to nose up, as illustrated in FIG. $3b$, this creates a resultant component of the thrust of the engines in the direction of the Z axis oriented upward, which has the effect of producing a diving torque of the aircraft 1, which tends to cause negative rotation around the Y axis of direction.

When the engines $5a$ and $5b$ are swiveled one at an angle to nose up and the other at an angle to dive with approximately the same amplitude, as in the case illustrated in FIG. $3c$, the vertical components of the thrust of each engine have approximately the same intensity, but opposite directions; the engine swiveled to nose up, the left engine $5a$ in FIG. $3c$, has a component oriented upward, and the engine swiveled to dive, engine $5b$ in the same figure, has a component oriented downward, which results in a vertical component that is approximately zero.

On the other hand, in this case, the lateral components $542a$ and $542b$ of the engine thrust are oriented in the same direction, which leads to a non-zero result for the lateral component of the engine thrust and to the production of a yawing torque on the Z axis of the aircraft.

The layout of the engines and their swivel mounting thus make it possible, by controlling the swiveling of the engines, to generate yawing torques or pitching torques of the aircraft by differential swiveling or symmetrical swiveling of the engines. The superposition by command of differential and symmetrical swiveling, obtained by independent control of the swiveling of each engine, thus makes it possible to generate combined pitching and yawing torques, which make it possible to control the attitudes of the aircraft on these two axes.

Figure 4A:
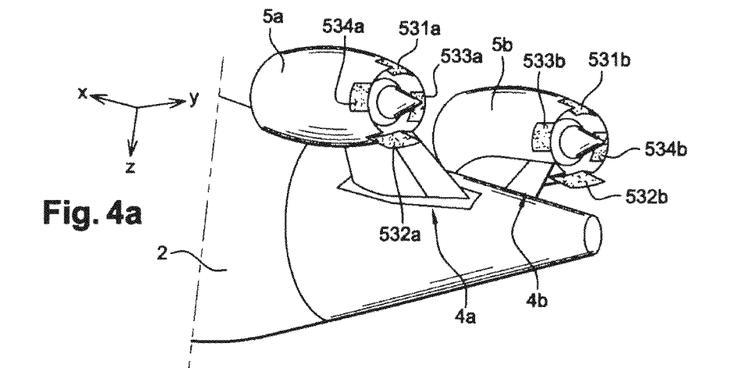
FIG. 4a: a perspective rear view of the aircraft in FIG. 1 illustrating the creation of a pitching torque to dive by means of engine nacelle flaps.
Figure 4B:
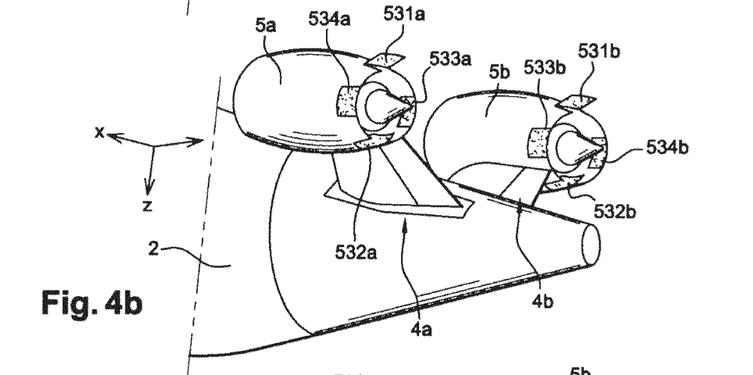
FIG. 4b: a perspective rear view of the aircraft in FIG. 1 illustrating the creation of a pitching torque to nose up by means of the engine nacelle flaps.
Figure 4C:
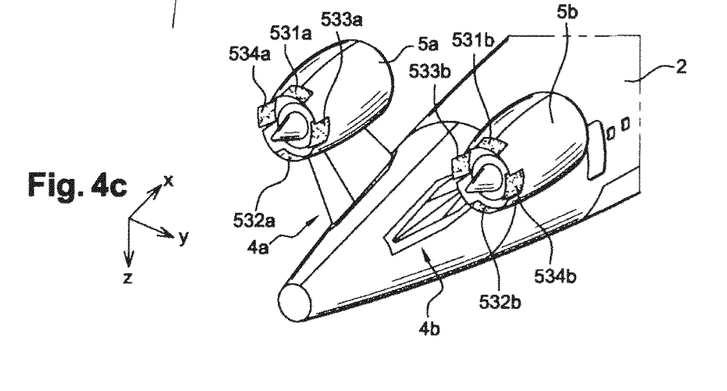
FIG. 4c: a perspective rear view of the aircraft in FIG. 1 illustrating the creation of a yawing torque by means of engine nacelle flaps.

Using the engine nacelle flaps:
This operating mode is illustrated in FIGS. $4a$, $4b$ and $4c$.

The engine nacelle flaps of an engine, as previously described, interfere with the jet of said engine. When engine nacelle flaps are deflected, they become the jet in the direction of deflection of said flaps, which has the effect of modifying the orientation of the thrust in the direction inverse to the direction of deflection of the jet.

Thus, when the vertical flaps 531a, 532a, 531b and 532b are oriented downward, as illustrated in FIG. 4a, the jets of the engines are deflected downward and the thrust is oriented upward, which causes a component of the thrust in the vertical direction Z oriented upward and generates diving torque on the aircraft 1.

Similarly, when the vertical flaps 531a, 532a, 531b and 532b are oriented upward, as illustrated in FIG. 4b, the jets of the engines are deflected upward and the thrust is oriented downward, which causes a thrust component in the vertical direction Z oriented downward and generates a nose-up torque.

When the horizontal flaps 533a, 534a, 533b and 534b are oriented sideways, toward the left or right of the aircraft, the jets of the engines are oriented to the left or right, respectively, and the thrust of the engines undergoes a deflection to the right or left, respectively.

The deviation of the thrust causes a lateral thrust component oriented in direction Y to the right of the aircraft or to the left of the aircraft, depending on the case, which generates a yawing torque on the aircraft.

The orientations of the vertical or horizontal flaps of the two engines are advantageously coordinated to act in the same direction, and when a yawing torque combined with a pitch torque is sought, the vertical and horizontal flaps are appropriately oriented simultaneously.

It should be noted that other combinations of layouts of engine nacelle flaps than the one shown in the figures are possible, and are within the field of this disclosed embodiment, if those combinations make it possible to modify the orientation of the thrust of the engines vertically and horizontally in a controlled manner.

The layout of the engine nacelle flaps thus makes it possible to control the orientations of said flaps to generate yawing torques or rolling torques of the aircraft or combined pitching and yawing torques, which make it possible to control the attitudes of the aircraft 1 on those two axes.

Figure 5A:
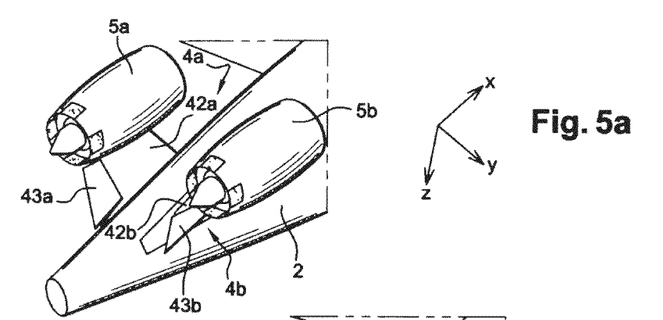
FIG. 5a: a perspective rear view of the aircraft in FIG. 1 illustrating the creation of a pitching torque to dive by means of engine pylon elevators.
Figure 5B:
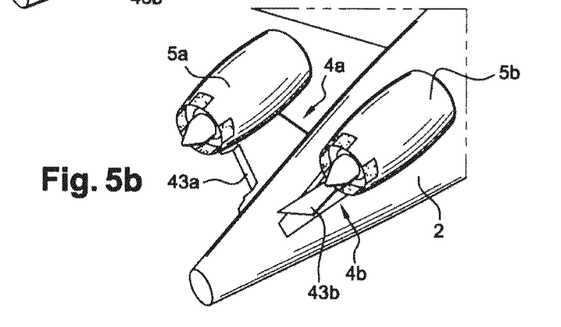
FIG. 5b: a perspective rear view of the aircraft in FIG. 1 illustrating the creation of a pitching torque to nose up by means of engine pylon elevators.
Figure 5C:
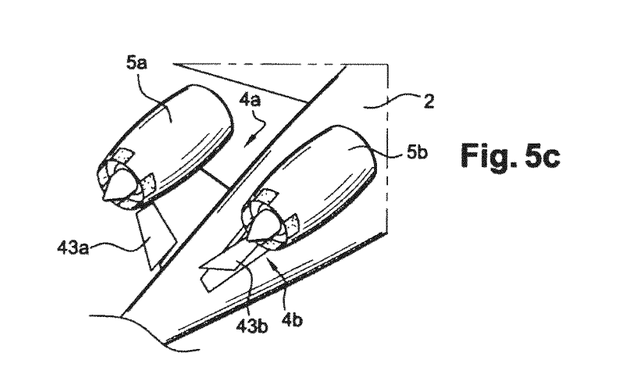

Use of engine pylons:

As illustrated in FIGS. 5a, 5b and 5c, the engine pylon control surfaces 43a, 43b are hinged on the primary structure 42a and 42b, respectively, of each engine pylon 4a, 4b.

In the example illustrated, each engine pylon includes a single control surface hinged on the side of one aerodynamic trailing edge of the engine pylon, which extends over part of the chord of the engine pylon in the longitudinal direction X.

The engine pylons 4a, 4b and the engine pylon control surfaces 43a, 43b work in a way similar to the known way in which V-shaped tail units, so-called ruddervator systems, work.

In such a type of tail unit, the aerodynamic forces generated in the presence of a flow associated with the displacement of the aircraft relative to the mass of air on each engine pylon and the associated control surface combine to produce aerodynamic forces with components oriented in the directions of the Y and Z axes to make it possible to control the pitch and yaw of the aircraft.

The aerodynamic surfaces formed by the engine pylons are also surfaces that ensure the stability of the aircraft in flight around a point of equilibrium for a tail unit system in the conventional way.

In the case of symmetrical deflection of the engine pylon control surfaces 43a, 43b downward, as illustrated in FIG. 5a, an aerodynamic upward force is generated that generates a diving torque for the aircraft 1 in the configuration presented.

In the case of symmetrical upward deflection, the case in FIG. 5b, a nosing up torque of the aircraft 1 is generated.

In the case of antisymmetrical deflection, as illustrated in FIG. 5c, an aerodynamic force oriented laterally is generated, which causes a yawing torque on the aircraft 1.

In practice, each dissymmetrical deflection configuration of the control surfaces can be considered as the superposition of a symmetrical and an antisymmetrical deflection whose effects on the torques generated are combined.

In one preferred form of embodiment of the disclosed embodiments, the engines are mounted fixed on the engine pylons and an engine is swiveled by swiveling the unit of the engine pylon and the engine in question.

In this case, illustrated in FIGS. 3a, 3b and 3c, the swiveling of the structure 42a, 42b of the engine pylon produces effects similar to the deflection of the engine pylon control surface. This situation is favorable in practice, since the aerodynamic forces generated by the engine pylon in plane XY and the component of the thrust of the engine joined with the engine pylon in plane XY during swiveling of the engine pylon/engine unit are oriented approximately in the same direction and hence combine their effects for a better common result, effects with which the effects of the engine pylon control surfaces and the engine nacelle flaps can also be combined.

In the aircraft 1 in the disclosed embodiments, all of the moving parts that have just been described, swiveling engines, engine nacelle flaps and, if need be, trailing edge engine pylon control surfaces are oriented by means of actuators, not shown, which can be from different technologies, such as hydraulic actuators, electric actuators, electro-hydraulic actuators . . . , controlled by a control system like a flight computer, not shown, which controls both the stability of the aircraft and its maneuvers.

The different moving parts are used in combination for these purposes taking into account the performance proper to each type of moving part and the associated actuator.

Preferably, moving parts with high inertia, basically the swiveling engines 5a, 5b and, if need be, the engine pylons 4a, 4b that are integral to the engines, will be used for functions not requiring elevated dynamics, such as flight balancing functions, so-called "trim," functions for which the acceptable establishment times are on the order of several seconds on a multiengine transport plane.

On the contrary, low inertia moving parts, basically the engine nacelle flaps 531a-b, 532a-b, 533a-b and 534a-b and, if need be, the engine pylon flaps 43a, 43b, capable of establishment times shorter than a second will preferably be used for steering and dynamic stability functions.

The moving parts in both categories can be used simultaneously, if needed for certain maneuvers.

Advantageously, the system of command also takes into account the status of the different systems, so that the capacities of the different units are used optimally, particularly if some component fails.

In particular, the case of failure of one of the engines must be considered.

In that case, the effects not sought by modifying the swivel angle of the engine in operation, for example the force on Y when a pitching torque alone is desired, are advantageously offset by action on another unit, the engine nacelle flaps and/or the engine nacelle flaps.

In creating the disclosed embodiments, swiveling the engines is essential and must be ensured in an effective, reliable manner.

For each engine, it is necessary that, despite the swiveling, all of the propulsive forces generated by the engine and the inertial forces associated with the weight of the engine be transmitted perfectly, with minimum play.

Figure 6:
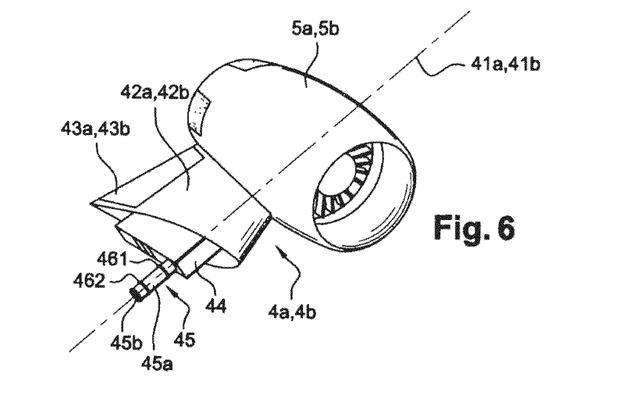
FIG. 6: a perspective view of a unit including an engine, engine nacelle and engine pylon without the fuselage.

FIG. 6 illustrates an engine 5a, 5b with an engine nacelle, in this instance a turbojet, highly diluted, and attached to an engine pylon 4a, 4b designed to be mounted on an aircraft fuselage, not shown in this figure.

The engine pylon, whose shape is not required, but corresponds, by way of illustration, to a profiled engine pylon that can form part of a rear tail unit system, basically includes a structural part, such as a structural box 44 to the first end of which is attached the engine 5a, 5b extended on the side of the opposite end to the first end, the so-called root, by the shaft 45 of an axis combined with the swivel axis 41a, 41b of the engine.

Figure 7:
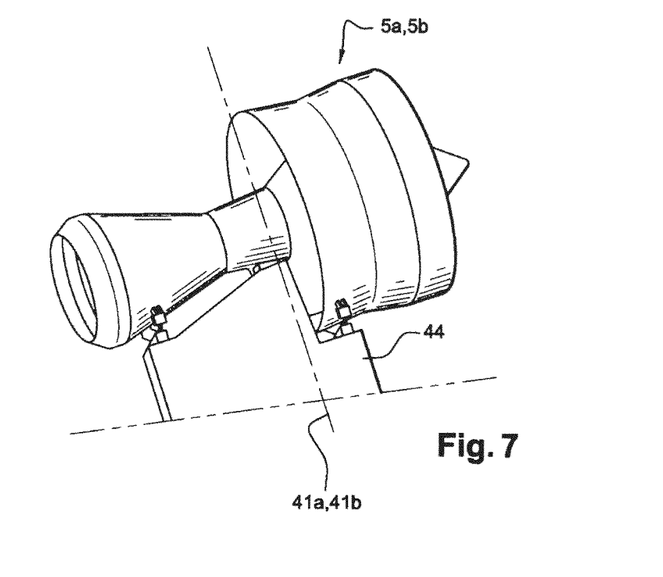
FIG. 7: a perspective view of an example of a pylon-engine connection.

The engine 5a, 5b is attached to the side of the first end of the structural box 44, as shown in FIG. 7, which does not show the engine nacelle of the engine, by conventional fasteners, generally connections using yoke joints and force-recovery spigots.

In this mounting, the engine is integral with the engine pylon with no degree of freedom, and swiveling the engine pylon causes the engine to swivel.

This mounting is preferred, since it has several advantages.

On one hand, the forces swiveling the engine pylon, which are a variation in the aerodynamic adjustment of said engine pylon, produce the same kind of effects and the same direction as swiveling the engine and, consequently, the effects combine favorably.

On the other hand, the interface area between the engine pylon and the fuselage is approximately simpler to lay out than the interface area between the engine pylon and the engine, due to the shape of said area, which has greater curves on the engine nacelle of the engine, and due to the space available for swivel devices, which is very small near the engine.

Figure 8A:
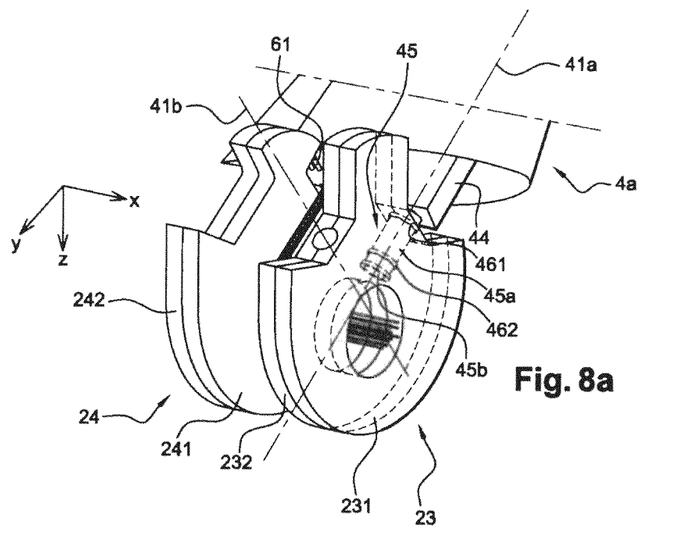
FIG. 8a: a perspective view of the front of an example in principle of a swivel connection of the engine pylon to the structure of the fuselage.

The shaft 45 is mounted on the side of the root of the structural box 44 so it can swivel on the swivel axis 41a, 41b on bearings 461, 462, as shown in FIG. 8a, in the cylinder bore of a first frame 23, which is integrated into the structure, not shown, on the back of the fuselage 2.

The first frame 23 has the general appearance of a thick disk, whose plane is approximately perpendicular to the direction X of the aircraft reference system, and the swivel axis 41a, 41b is approximately in a median plane of said disk in an approximately radial direction.

In the embodiment described, the first frame 23 is symmetrical in relation to a vertical plane of symmetry XZ of the aircraft and holds the two engine pylons 4a, 4b, with only one engine pylon shown in FIG. 8a.

Preferably, this whole assembly, which is critical in terms of safety and must withstand huge forces, is made using to a "fail safe" design to limit the consequences of failure of a basic structural element.

Thus, the shaft 45 is made by means of two coaxial shafts 45a and 45b, each of which guarantees the integrity of the connection of the engine pylon 4a, 4b to the first frame 23, and said first frame is made by assembling two frames 231 and 232.

Figure 8B:
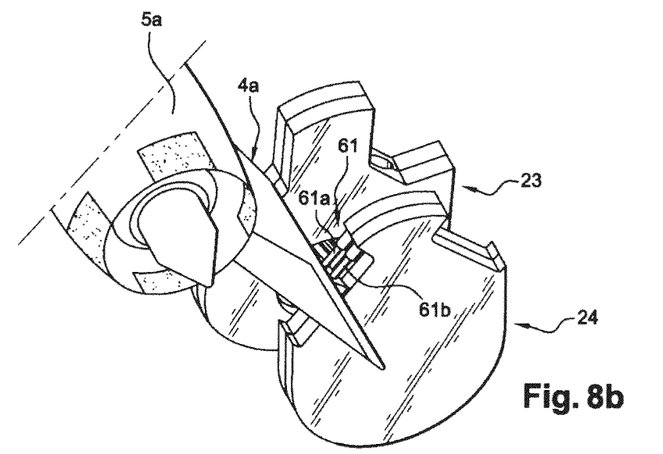
FIG. 8b: a perspective view from the rear of the connection in FIG. 8a illustrating an example of the working principle of a swivel actuator.

A second frame 24, staggered in relation to the first frame 23 in the longitudinal direction X of the aircraft, for example behind said first frame, determines points of support for actuators 61, visible in FIG. 8b, which act on the box 44 to modify the swivel angle of said box, and hence of the engine pylon 4a, 4b and of the engine 5a, 5b on its axis 41a, 41b.

Preferably, the second frame is also backed 241, 242 using a fail-safe design, and the actuator 61 has sufficient redundancy, considering the functional safety requirements for the device, which is one of the flight controls, for example, at least two action elements 61a and 61b that use separate power sources.

Figure 8C:
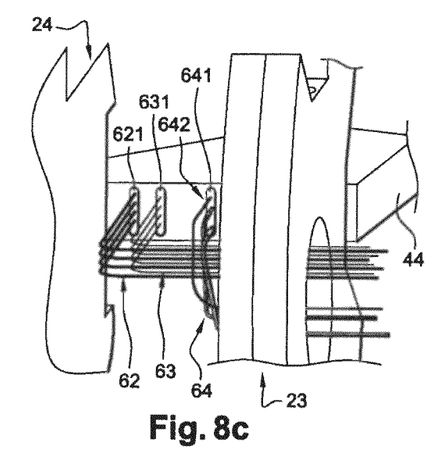
FIG. 8c: a perspective view of the root of the engine pylon near the connection in FIG. 8a illustrating an example of cable and conduit routing between the engine pylon and the fuselage.

Because of the angular swiveling of the box 44 around the shaft 45, all of the electrical ducts and cables of different kinds visible in FIG. 8c between the engine attached to the engine pylon and the fuselage must be designed to prevent damage.

The electric, power or command and control cables 62, 63 generally have enough flexibility, provided there are installation precautions, to accept the displacements considered at the passage openings 621, 631 of said electric cables to the box 44.

The ducts 64, for example, the hydraulic and/or fuel ducts and/or ducts for extinguishing products, have less rigidity and are connected near the passage openings 641 to the box 44 by means of flexible connections 642.

Figure 9:
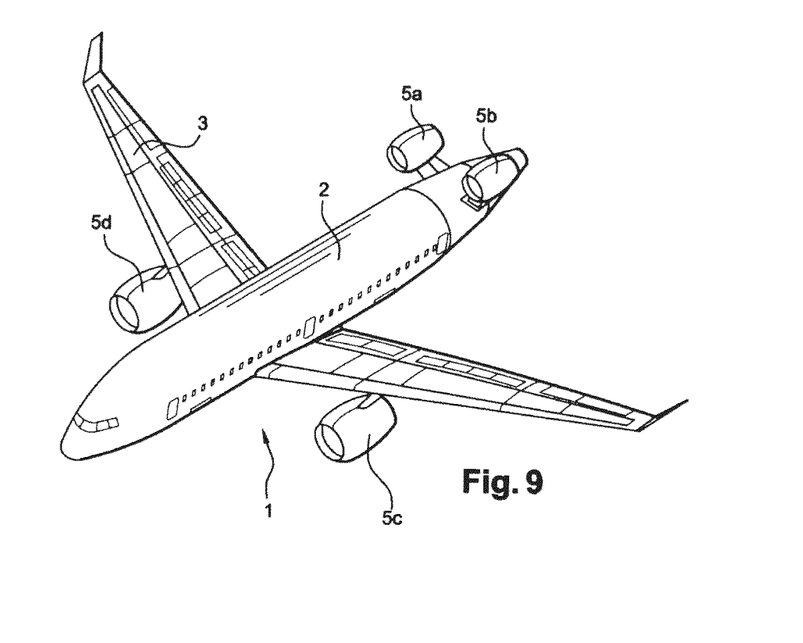
FIG. 9: a general perspective view of a four-engine aircraft in the disclosed embodiments.

In one special embodiment, the disclosed embodiment is used for an aircraft that has, besides swivel engines 5a, 5b, fixed propulsion engines, for example, engines under the wing 3, as in the example in FIG. 9, which shows a four-jet airplane according to the disclosed embodiments having two swiveling rear engines 5a, 5b and two fixed engines 5c, 5d held under the wing 3 by means of conventional attachment engine pylons.

The disclosed embodiments make it possible to build an aircraft that is optimized in terms of pitch and yaw control possibilities by using the thrust, which can be oriented, of two engines far from the center of gravity; this prevents the need for a conventional tail unit or at least significantly reduces its dimensions.

A gain is obtained in terms of the wet surface of the structure and hence the aerodynamic drag and weight.

It is also possible to control the pitch and yaw of the aircraft effectively, even when the aerodynamic speed is zero or too low to be ensured by conventional aerodynamic tail units.

The invention claimed is:

1. An aircraft having a wing, a fuselage, at least two jet engines, and at least two engine pylons, each jet engine having an engine nacelle and being attached to the fuselage on an outside of said fuselage by an engine pylon, wherein:

the at least two engine pylons are arranged substantially symmetrically on opposite sides of the fuselage, each in a position between a vertical and horizontal direction in accordance with the aircraft reference system, in a V arrangement;

each of the at least two engines is swivel mounted on one of the pylons, wherein the engines on opposite sides of the aircraft swivel independently, each pylon having a swivel axis approximately in a YZ reference plane of the aircraft perpendicular to a longitudinal X axis of the aircraft, each engine pylon is profiled aerodynamically to form an aerodynamic surface of a V-tail unit of the aircraft;

each swivel axis of the swiveling engines is oriented substantially parallel to an axis of the pylon of the corresponding engine;

wherein the swiveling of the engines during flight of the aircraft selectively corresponds to a creation of a pitching torque and a yawing torque, the pitching torque being created by swiveling the engines on opposite sides of the fuselage in opposite directions around a Y axis of the aircraft, the yawing torque being created by swiveling the engines on opposite sides of the fuselage in opposite directions around a Z axis of the aircraft.

2. The aircraft in claim 1 in which each engine nacelle of the at least two swiveling engines has at least three moving flaps for deflecting a jet of the engine into a rear area of the engine nacelle.

3. The aircraft in claim 2, in which each engine nacelle of the at least two swiveling engines has at least two vertical flaps, each engine nacelle moving on an approximately horizontal axis in the reference system of the aircraft, for deflecting the jet of the engine into an approximately vertical plane XZ and at least two horizontal flaps, each moving on an approximately vertical axis in the reference system of the aircraft, for deflecting the jet of the engine in an approximately horizontal plane XY.

4. The aircraft in claim 1, in which each engine pylon has at least one flap at a trailing edge of the aerodynamic surface, said at least one flap forming an aerodynamic control surface of the V-tail unit of the aircraft.

5. The aircraft in claim 1 in which each of the at least two swiveling engines is attached to the corresponding engine pylon with no degree of freedom, and in which each engine pylon is attached to the fuselage so that the engine pylons swivel.

6. The aircraft in claim 5, in which each engine pylon has a structural box, a first end of which is attached the engine and to a second end of which at a root side a shaft cooperates with a frame of the fuselage, so as to give said engine pylon a degree of freedom to rotate on the swivel axis and in which aircraft an actuator is connected to the structural box, on one hand, and to a structure of the fuselage, on the other hand, for producing a driving torque as the box rotates on said swivel axis.

7. The aircraft in claim 6, in which the frame is formed from at least two assembled elements and the shaft is formed from at least two coaxial shafts designed to form a fail-safe structure.

8. The aircraft in claim 2, in which at least one of servo time constants for actuators used to move moving parts of the aircraft are determined on the order of one second or more for dynamic control of movements on the swivel axes of the swiveling engines, and servo time constants for control dynamics of the moving flaps of the engine nacelles are determined on the order of less than one second.

9. The aircraft in claim 8 in which a control system formulates orders to swivel the swiveling engines as a priority for functions to balance the aircraft or trim, and formulates orders to deflect the engine nacelle flaps or the trailing edge engine pylon control surfaces, as a priority, for functions of steering the aircraft or dynamic stability of the aircraft.

10. The aircraft in claim 8 in which a control system formulates orders to swivel the swiveling engines as a priority for functions to balance the aircraft or trim, and formulates orders to deflect the engine nacelle flaps, as a priority, for functions of steering the aircraft or dynamic stability of the aircraft.

11. The aircraft in claim 3, in which servo time constants for actuators used to move the moving parts are determined on the order of one second or more for dynamic control of movements on the swivel axes of the swiveling engines, and servo time constants for control dynamics of the moving flaps of the engine nacelles, or for engine pylon trailing edge control surfaces of each engine pylon of the two swiveling engines, are determined on the order of less than one second.

* * * * *